Patented Aug. 18, 1942

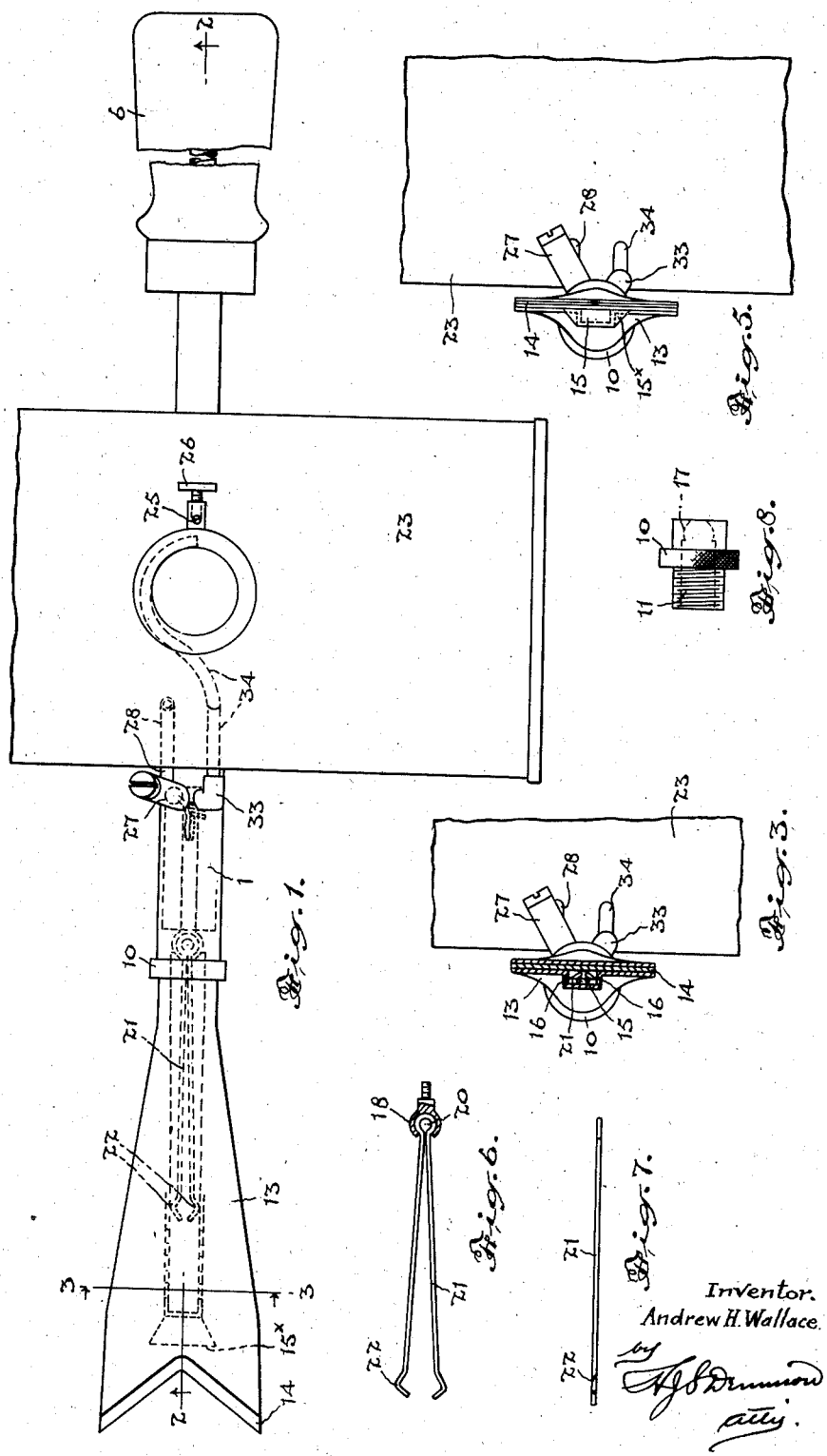

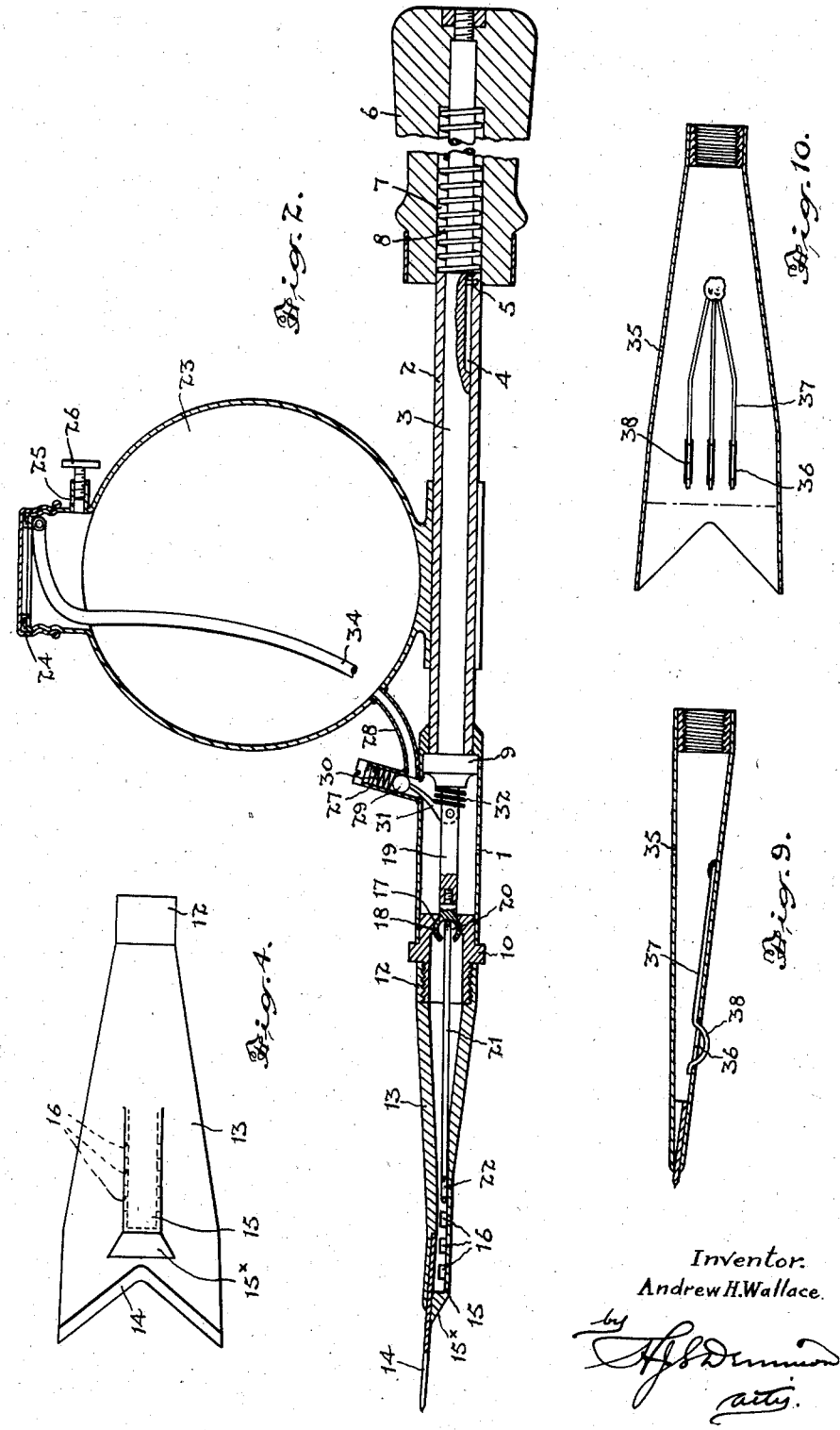

2,293,090

UNITED STATES PATENT OFFICE 2,293,090

WEED EXTERMINATOR

Andrew H. Wallace, Lockport, N. Y.

Application June 28, 1940, Serial No. 342,850

10 Claims. (Cl. 47—49)

The principal objects of the invention are to provide a small compact and easily manipulated hand tool by means of which noxious weeds may be severed at the top of the root and in the severing operation a small quantity of an exterminating fluid may be applied to the freshly cut roots in such a manner that the fluid will be localized to the immediate vicinity of the roots so as to obviate damage to the surrounding grass or other vegetation.

A further object is to provide an implement having a very simple and positive means of ejecting a limited quantity of the destructive fluid and further, to provide means for effectively preventing the clogging of the liquid discharge orifices.

The principal features of the invention consist in the novel construction of the tool for cutting the weed root whereby a duct is arranged on the underside thereof having discharge orifices to project the killing fluid centrally of the cutter, means being arranged within the duct to automatically clear the orifices of obstructions which may be forced thereinto in the cutting operation.

A further important feature consists in the arrangement of a plunger within a cylinder connected with a fluid supply, the plunger being operated by the handle to forcibly eject a measured quantity of fluid through the orifices in the cutter.

A still further important feature consists in the novel arrangement of means for controlling the flow of liquid automatically controlled by the movement of the plunger.

In the accompanying drawings,

Figure 1 is a plan view, broken away in part, of my improved weed exterminating implement.

Figure 2 is a longitudinal section of the device taken through the line 2—2 of Figure 1.

Figure 3 is a sectional elevational view taken through the line 3—3 of Figure 1.

Figure 4 is an underside plan view of the cutter illustrated in Figure 1.

Figure 5 is an elevational detail taken from the front end of the cutter.

Figure 6 is a detail plan view of the orifice-clearing device illustrated in Figures 1 and 2.

Figure 7 is a side elevational view of the looped wire member of the clearing device shown in Figure 6.

Figure 8 is an elevational detail of the member connecting the nozzle to the liquid discharge cylinder.

Figure 9 is a longitudinal sectional view of a modified form of cutter and orifice-clearing device.

Figure 10 is a plan sectional view of the cutter illustrated in Figure 9 showing the arrangement of the orifice-clearing fingers.

In the maintenance of lawns and gardens it is well understood that great difficulty is experienced in the extermination of noxious weeds and particularly those weeds of the flat surface covering type such as dandelion and plantain and it is the purpose of this invention to provide an implement which will not only effectively sever the top from the root but will apply a killing liquid to the freshly cut roots in a manner which will insure the liquid reaching the heart of the root but which will not spread the killing liquid so as to damage the surrounding vegetation.

In order to accomplish this it is necessary that the liquid be brought into contact with the freshly cut root and that a very limited quantity of the liquid be discharged with each operation of the implement. Further, it is extremely important that the liquid discharge be made very positive so that the operator will be assured that liquid is discharged with each cutting stroke.

In the construction of the device herein shown a small cylinder 1 is rigidly mounted at one end upon a tubular stem 2 and a rod 3 is slidably mounted within the tube 2, the rod being provided with a keyway 4 engaged by a pin 5 secured in the stem 2.

A handle 6 is secured to the outer end of the rod 3 and is formed with a cylindrical recess 7 to slidably receive the end of the tubular stem 2. A coil compression spring 8 is housed in the recess 7 and engages the end of the stem 2, the spring permitting the handle to be pushed inwardly over the stem to effect the sliding of the rod 3 within the stem.

A piston 9 slidably mounted within the cylinder 1 is secured to the inner end of the rod 3 and moves in the cylinder with the inward movement of the handle. The forward end of the cylinder 1 is closed by a plug member 10 which has a threaded nipple end 11 upon which is threaded a tubular end 12 of a hollow cutter 13. This cutter flares outwardly and is flat and has a V-shaped steel blade 14 at its extremity for the cutting of the roots of the weeds.

The underside of the member 13 is provided with a raised rib member 15 which has a plurality of narrow orifices 16 formed in its side walls through which the liquid for effecting the killing of the weeds is projected. The plug 10 is formed with a convergent orifice 17 which forms a valve seat. This seat is closed by a ball-shaped member 18 secured to a narrow stem 19 extending forwardly from the piston. The valve member 18 is formed with a recess 20 in its outer end in which a looped end of a double prong spring wire member 21 is loosely mounted. The outward extremities of the member 21 are preferably hook shaped as represented at 22 with the knee or angle of the hook extending outwardly and this spring wire member is adapted to slide back and forth within the narrow passage inside the rib 15 in such a manner that the knees or angles of the prong project outwardly through the orifices 16.

This resilient member is moved back and forth with every operation of the piston so that it presses outwardly and clears the orifices of any dirt or grass which might be forced into the openings in the operation of cutting the weeds.

Mounted upon the tubular stem 2 is a reservoir 23 which holds a considerable quantity of the weed killer fluid. This is provided with a cap 24 and it also has an air vent 25 controlled by an adjusting screw 26.

Adjacent to the inner end of the cylinder 1 there is arranged a small tubular member 27, the lower end of which is connected to the reservoir 23 by a tube 28. The fluid from the reservoir flows through the tube 28 into the bottom of the member 27 and within the member 27 is arranged a ball valve 29 held against the seat at the bottom by a coil spring 30. This ball valve prevents the inflow of fluid to the cylinder and shuts at predetermined times.

A smaller finger 31 is mounted within a slot in the stem 19 extending forwardly from the piston 9 and this finger is urged outwardly by a coil spring 32 encircling the stem. The finger in the forward movement of the piston rides within the cylinder and when the piston moves backwardly the finger swings outwardly and lifts the ball valve 29 from its seat after the piston has passed the entry port closed by the valve. Liquid then flows in to fill the cylinder.

It is of course necessary to release the air which will be trapped within the cylinder, and a tubular connection 33 arranged adjacent to the valve chamber 27 connects with a tube 34 which extends upwardly through the interior of the reservoir 23 and the upper open end thereof is coiled inside of the cap extension at the top of the reservoir. Air from the cylinder is thus carried to the top of the reservoir and a slight pressure is created by the return movement of the piston within the cylinder 1 which assists the flow of the liquid into the cylinder through the valve chamber described.

It will be noted that when the piston has moved to its outward position to clear the fluid inlet from the reservoir the valve 18 closes against the valve seat 17 in the plug 10.

A slightly modified construction of cutter blade is shown in Figures 9 and 10 in which a hollow blade-holding member 35 is provided with a plurality of narrow slots 36 in its under side. Means for keeping these slots free from being fouled by dirt and grass is provided in the simple form of pieces of spring wire 37 soldered or otherwise secured at their inner ends to the member 35 and having rounded or partially looped outer end portions 38 which project through the slots. The wires 37 may be secured to the piston rod if desired.

As the cutter is forced into the ground or through the grass over a root these spring loops will spring inwardly but they do not interfere with the discharge of the killing fluid and immediately the implement is withdrawn they spring outwardly and clear the slots of any refuse.

In the operation of this implement the operator holds the handle 6 and, inserting the blade under the head of the weed to be cut, pushes forwardly. The resistance of the weed and the grass and the root itself pushes back against the coiled spring 8 in the handle with the result that the rod 3 and the piston carrier thereby are moved forwardly. The valve 18 opens the valve seat 17 and the piston moving forwardly forces the liquid contained within the cylinder 1 out through the hollow blade holder and the liquid is discharged directly into contact with the weed root where it is cut. The valve 29 automatically closes upon the forward operation of the piston.

Upon the release of the instrument the spring 8 forces the tubular stem 2 forwardly thus moving the piston 9 backwardly within the cylinder 1, and the air within the cylinder is forced back through the tube 34 to the reservoir. When the piston passes the valve opening at the back end of the cylinder the finger 31 releases the valve and permits the liquid to flow through the tube 28 to again fill the cylinder. The valve 17 has in the meantime been closed so that the liquid will not run out of the cylinder and empty the reservoir in the event of the instrument being laid down or carelessly set aside. Further it prevents the volatile fluid, which is usually used, from evaporating.

It will be noted that each time the implement is used and the rod 3 is moved forwardly within the tubular stem, the liquid is projected from the cylinder through the hollow blade holder and the spring member connected with the valve 18 moves along and ensures the clearing of the discharge holes.

The closing of the valve 29 prevents the flow of fluid to the cylinder when the piston moves forwardly.

The device is small and light, easy to handle. The reservoir contains a considerable quantity of killing fluid and a person may operate the instrument without fatigue for a very considerable period and, in its use, is assured that wherever the weeds are cut a charge of killing fluid is ejected which results in the extermination of the weeds.

It will be noted particularly on reference to Figure 4 that thre is a bevelled surface 15$^x$ arranged at the forward end of the raised rib member 15 which is wider than the rib and serves to spread the earth into which the cutter is forced so as to clear the discharge openings in the sides of the rib.

What I claim as my invention is:

1. A weed exterminator comprising a hollow cutter having a discharge opening in the underside thereof, a cylinder connected with said cutter, a fluid reservoir connected with said cylinder, a piston operating in the cylinder to project a charge of fluid through the cutter, and a handle operatively connected with said piston, and cooperating with said hollow cutter for forcing same into the ground and having limited sliding displacement relative to said cutter to effect fluid-discharging displacement of the piston, and spring means for returning said handle and piston in the reverse direction to normal position following the fluid discharge movement of said piston.

2. A weed exterminator comprising a hollow cutter member having a discharge orifice arranged in the underside thereof, a cylinder connected with said cutter having a hollow stem extension, a handle slidably mounted on said stem, a rod secured to said handle and extending through said stem into said cylinder, a piston in the cylinder secured to said rod, a reservoir connected with said cylinder, valving means controlling the flow of fluid to the cylinder from the reservoir, and spring means for effecting the return movement of the piston in the cylinder following a pressure movement thereof by the rod and handle.

3. A weed exterminator comprising a cylinder, a hollow cutter member extending from one end of said cylinder, a reservoir connected with said cylinder, a piston operating in said cylinder, a valve connected with said piston closing the passage between the cylinder and hollow cutter, a rod rigidly secured to said piston having a handle mounted thereon, a stem connected with said cylinder and slidably encircling said rod, and a compression spring arranged between said handle and said tubular stem.

4. A weed exterminator comprising a cutter having a liquid passage therethrough and a discharge orifice in the underside of the cutter, a cylinder connected with said cutter, a tubular stem secured to said cylinder, a handle slidably mounted on the outer end of said tubular stem, a rod secured to said handle slidably extending through said stem, a compression spring encircling said rod and abutting said stem and handle, a piston mounted on the inner end of said rod within the cylinder, a stem extending from the piston rod through the cylinder, a closure member on the end of the cylinder having a valve seat, a valve mounted on the end of said piston rod stem and engaging the said valve seat to close the cylinder when the piston is at the back end of its stroke, a reservoir, means for feeding fluid to the cylinder from said reservoir, and means for controlling the flow of fluid from the reservoir to the cylinder actuated by the operation of the piston.

5. A weed exterminator comprising a hollow cutter member having a discharge orifice in the underside thereof, a cylinder connected to said hollow member, a piston operating in said cylinder to force fluid through the cutter, a valve carried by said piston closing the opening from the cylinder to the cutter and opening on the discharge operation of the piston, a reservoir connected with the cylinder, a valve closing the passage from the reservoir to the cylinder, a finger operable with the piston and arranged to engage and lift said latter valve when the piston operates in its return stroke, a handle operatively connected with the piston, and means connected with the cylinder for guiding the handle.

6. A weed exterminator comprising a hollow member having a cutter blade, said hollow member having a plurality of openings in the underside thereof, spring members arranged within said hollow member adapted to extend into said openings to clear same of obstructions, a reservoir, a cylinder connected with said reservoir and mounted on said cutter-supporting member, a handle supported from said cylinder, and a piston operating in the cylinder operatively connected with said handle.

7. A weed exterminator comprising a hollow cutter member having a discharge orifice in the underside thereof, a cylinder secured to said hollow cutter member, a piston operating in said cylinder, a handle connected with said piston adapted to move said piston in said cylinder, a spring wire member connected with the piston and extending into the hollow member and operating to clear the discharge orifices in the cutter with the reciprocating movement of the piston, a reservoir connected with the cylinder, and means for controlling the flow of fluid to and from the cylinder.

8. A weed exterminator comprising a hollow cutter having discharge orifices therein, a cylinder connected with said cutter, a reservoir supported from the cylinder, a tubular connection from the bottom of the reservoir to the cylinder, an air vent from the cylinder leading to the top of the reservoir, a piston operating in the cylinder, and a handle operatively connected with said piston.

9. A weed exterminator comprising a hollow cutter member having fluid discharge orifices in the underside thereof, a cylinder rigidly connected to said hollow member, a tubular stem rigidly secured to said cylinder and extending in alignment therewith, a piston operating in the cylinder, a rod slidably mounted in said tubular stem, a handle secured to said rod, a spring encircling said rod and engaging the end of said tubular stem, a reservoir mounted on said tubular stem, a tube connecting said reservoir with said cylinder, and means for controlling the flow of fluid from the reservoir to the cylinder.

10. A weed exterminating device comprising a hollow cutter having a laterally disposed discharge opening in the underside thereof, a cylinder connected with said cutter, a fluid reservoir connected with said cylinder, a piston operating in the cylinder to force a charge of fluid through the cutter, a handle operatively connected with said piston, and means automatically displaceable laterally into and out of said discharge opening to clear the same of obstruction during each operation of the device.

ANDREW H. WALLACE.